United States Patent [19]

Elmqvist et al.

[11] 4,100,550

[45] Jul. 11, 1978

[54] LIQUID JET RECORDER

[75] Inventors: Rune Elmqvist, Bromma; Bertil Almgren, Vallingby, both of Sweden

[73] Assignee: Siemens Aktiengesellschaft, Berlin & Munich, Germany

[21] Appl. No.: 776,768

[22] Filed: Mar. 11, 1977

[30] Foreign Application Priority Data

Mar. 30, 1976 [DE] Fed. Rep. of Germany ....... 2619369

[51] Int. Cl.² .......................... G01D 15/18; B41J 3/04
[52] U.S. Cl. ................................. 346/140 R; 346/75; 346/139 R
[58] Field of Search .................. 346/140 R, 139 R, 75

[56] References Cited

U.S. PATENT DOCUMENTS

| 2,566,443 | 9/1951 | Elmqvist | 346/75 |
| 3,087,772 | 4/1963 | Ascoli | 346/140 R |
| 4,062,020 | 12/1977 | Berglund | 346/75 X |

Primary Examiner—Joseph W. Hartary
Attorney, Agent, or Firm—Hill, Gross, Simpson, Van Santen, Steadman, Chiara & Simpson

[57] ABSTRACT

A liquid jet recorder having a capillary tube with one end connected by a filter to a liquid pump and the other end formed in a nozzle for directing a recording jet of liquid onto a recording carrier, an electromagnet having a core and winding and a permanent magnet carried by the capillary tube and arranged in an air gap of the electromagnet characterized by the core of the electromagnet comprising an inner tube having the winding arranged thereon with the inner tube and winding coaxially surrounding the capillary tube. Preferably, the electromagnet includes an outer tube having an extension and the inner tube has an extension which forms the poles of the electromagnet and includes a centering sleeve of non-magnetizable material arranged between the inner and outer tube to determine the air gap between the two extensions.

10 Claims, 2 Drawing Figures

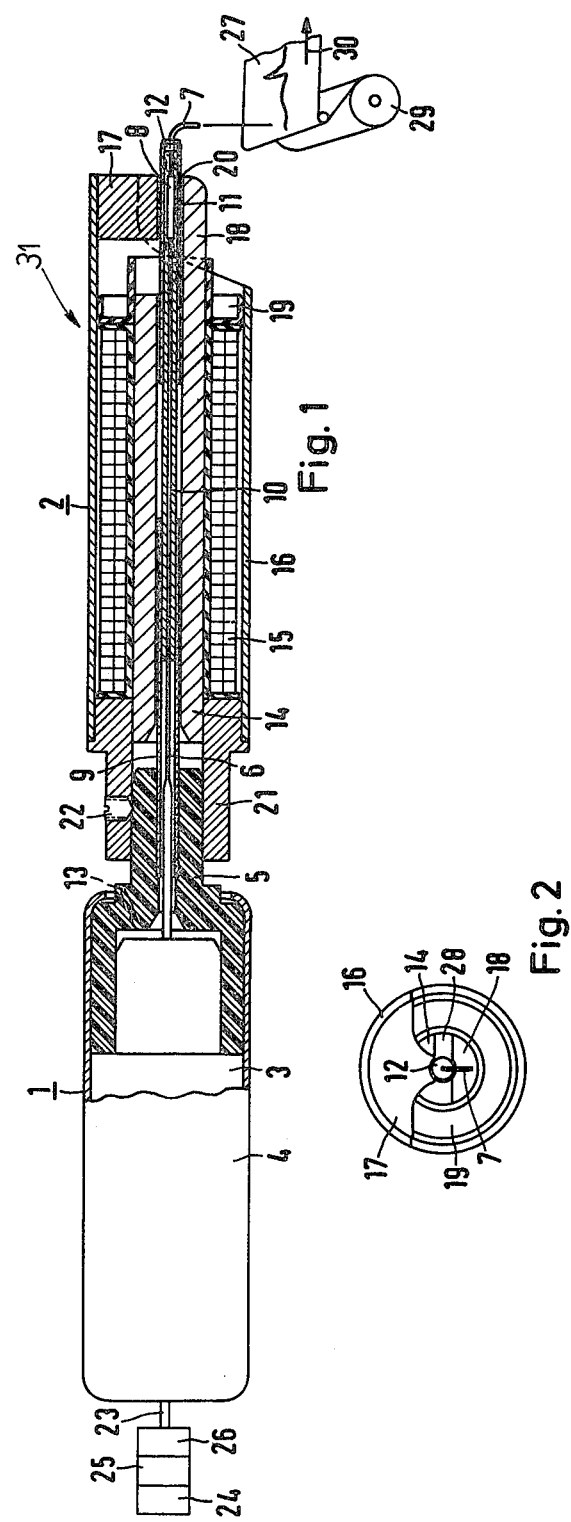

LIQUID JET RECORDER

BACKGROUND OF THE INVENTION

1. Field of the Invention

The present invention is direction to a liquid jet recorder having a capillary tube and an electromagnet which consists of a core and a winding. The capillary tube is connected at one end to a liquid pump by means of a filter and its other end is bent to form a nozzle that directs the recording jet of liquid onto a recording carrier and has a permanent magnet attached to the capillary tube and arranged between an air gap of the electromagnet.

2. Prior Art

Liquid jet recorders are known. One example of a liquid jet recorder has a capillary tube which is disposed between two parallel pieces of wire stretched across a magnetic field of a stationary permanent magnet. A bent part of the capillary tube forms a nozzle and will have a rotational movement corresponding to the currents in the wire. An example of this type of liquid recorder is disclosed and described in United States Letters Pat. No. 2,566,443.

Another known type of liquid jet recorder has a winding of the electromagnet which extends transverse to the longitudinal direction of the capillary tube. In addition, the capillary tube and electromagnet are combined into a single unit in a support stand.

The two above mentioned liquid jet recorders have several disadvantages. For example, in the first mentioned type, the permanent magnet and the second mentioned type the electromagnet takes up a considerable amount of space which requires that the recorders have a relatively large dimension. Another disadvantage of the known recorders is that they are of a complicated structure.

SUMMARY OF THE INVENTION

The present invention is directed to providing an improved liquid jet recorder which takes up little space and is simple in structure. To accomplish this task, the present invention is directed to an improvement in a liquid jet recorder which has a capillary tube, an electromagnet, and a permanent magnet. The capillary tube is connected at one end of a filter, which is connected to a liquid pump and the other end of the capillary tube is bent to form a nozzle that directs a recording jet onto a recording carrier or medium. The electromagnet comprises a core and a winding and the permanent magnet is attached on the capillary tube and arranged in an air gap of the electromagnet. The improvements comprises the core of the electromagnet being an inner tube having the windings provided thereon with the inner tube coaxially surrounding the capillary tube with the winding being coaxial with the capillary tube. Preferably, the capillary tube is provided along a straight section thereof with a guide and dampening tube and the capillary tube is supported in the guide and dampening tube by a pair of bearings disposed on each side of the permanent magnet. The guide and dampening tube is preferably filled with a dampening liquid, for example oil.

The electromagnet in addition to the inner tube, which has an extension, is also provided with an outer tube having an extension. The outer tube coaxially surrounds the inner tube and winding with the extensions forming the poles of the electromagnet which has a centering sleeve of non-magnetizable material disposed between the inner tube and the outer tube to determine the air gap between the two extensions.

Preferably, the capillary tube is fixedly connected to the filter and forms a filter capillary unit on which the electromagnet is detachably fitted. To facilitate assembly of the electromagnet onto the capillary unit, the inner tube is provided with a longitudinal slot to enable passage of the nozzle as the nozzle is passed the full length of the inner tube during assembly. Preferably, the capillary unit and the electromagnet have the same external diameters so that when they are assembled, they assume a pinlike configuration.

BRIEF DESCRIPTION OF THE DRAWINGS

FIG. 1 is a longitudinal cross-sectional view with portions in elevation for purpose of illustrated of a liquid jet recorder is accordance with the present invention; and FIG. 2 is an end view of the liquid jet recorder illustrated in FIG. 1.

DESCRIPTION OF THE PREFERRED EMBODIMENTS

The principles of the present invention are particularly useful in a liquid jet recorder generally indicated at 31 in FIG. 1. The jet recoder 31 includes a filter capillary unit 1 and an electromagnet 2.

The filter capillary unit 1 consists of a filter 3 which is encased in a housing 4 and the filter 3 has a cylindrical projection 5 which extends from the housing 4. A capillary tube 6, which, for example, may be a thin glass tube, extends from communication with the filter 3 through the projection 5. One end of the capillary tube is fixed to the filter and the other end is bent approximately 90° and forms a nozzle 7. Adjacent to the bent part forming the nozzle 7, the capillary tube carries a cross-magnetized permanent magnet 8, which is secured to the capillary tube 6.

A straight portion or section of the capillary tube 6 is guided and received in a guide and dampening tube or arrangement, which consists of a tube 9 that is connected to the projection 5, a tube 10 which has a portion secured in the tube 9 and finally a tube 11 which is telescopically pushed or slipped onto the tube 10 and fixed thereto. The tubes 9, 10 and 11 may be made for example of metal, glass or plastic, with a non-magnetizable material being used for the tube 11. To support the capillary tube 6 in the tube 11, a bearing 12 which may be of silver or a ruby is provided at the free end of the tube 11. In addition, the tube 10 will serve as a bearing for the capillary tube 6 so that the capillary tube is supported on each side of the permanent magnet 8 by a bearing, which stabilizes the capillary tube and the permanent magnet 8. The guide and dampening tube formed of the tubes 9, 10 and 11 is also used for vibration dampening of the capillary tube 6 and is filled with oil, for example silicon oil, through a hole 13 in the projection 5.

The electromagnet 10 comprises an inner tube 14 of soft iron, which tube coaxially surrounds the capillary tube 6 and the guide and dampening tube arrangement. A winding 15 is arranged coaxially on the core 14. The electromagnet 2 further comprises an outer tube 16 of soft iron, which acts as a housing for the electromagnet 2. The outer tube 16 also acts as a magnetic screen or shield so that in the case of several recorders being arranged closely adjacent to one another, the outer tube 16 prevents the recorder from being magnetically influenced by adjacent recorders. The outer tube 16 is provided with an extension 17 and the inner tube 14 has an extension 18. The extensions 17 and 18 form the poles of the electromagnet 2 and the permanent magnet 8 which is attached to the capillary tube 6 is arranged therebetween. A centering sleeve 19 of nonmagnetizable material is arranged between the inner tube 14 and the outer tube 16 and will determine the size of the air gap 20 between the two extensions 17 and 18. The electromagnet tube also includes a sleeve 21 of soft iron, which is detachably secured to the projection 5 of the capillary unit 1 by means of the screw 22 and which completes the magnetic circuit between the inner tube 14 and the outer tube 16.

The filter capillary unit 1 is connected by a line 23 to a pump 25 for the recording liquid. The pump 25, which receives the recording liquid from the recording liquid reservoir 24, pumps the recording liquid through a pressure controller 26, which assures that the recording liquid is delivered to the jet recorder 31 under a constant pressyre. The recording liquid flows under a high pressure through the filter 3, through the capillary tube 6 and is sprayed out from the nozzle 7, which is directed onto a recording carrier or medium 27 to thereby make a recording. The recording carrier 27 is driven or advanced by a motor and moves in a direction of arrow 30 from a roll 29.

When a measurement is being made, the means producing a measuring signal will deliver the signal to the winding 15 which will generate magnetic fluxes in the electromagnet 2 that will deflect the nozzle 7. Due to the extensions 17 and 18, which form the poles of the electromagnet, the cross-magnetized permanent magnet 8 will be influenced and will rotate or twist the capillary tube with the nozzle 7 about the axis of the tube. Thus, the fluxes generated in the electromagnet 2 cause a torsional twisting of the capillary tube.

The inner tube 14 of the electromagnet 2, as best illustrated in FIG. 2, is provided with longitudinally extending slot 28. The slot 28 allows the downwardly bent part 7 which forms the nozzle 7 of the capillary tube 6, to pass through the electromagnet 2 as the magnet is being assembled with the filter capillary unit 1.

The filter capillary unit 1 and the electromagnet 2 are preferably provided with the same external diameter and when assembled together provide a pin-like configuration. The shape of the core of the electromagnet provides the recorder with a high sensitivity. In addition, the compact structure of the recorder of the present invention enables the tolerances to be kept low. Accordingly, it is possible for example in the case of an EEG apparatus to accommodate more recorders and therefore more channels on a specific width of recording paper than were possible in an apparatus which used known types of recorders.

One advantage of the embodiment of the present invention is that the capillary tube is fixedly connected to the filter and thus forms a capillary filter unit or section on which the electromagnet is detachably assembled. In this way, the filter capillary unit may be easily replaced, for example in the event of damage to the capillary tube or in the event of a blockage in the filter.

As illustrated in FIG. 1, the components such as the reservoir 24, the pump 25, the pressure controller 26, the carrier 27 and the roll 29 have been illustrated in reduced scale as compared to the capillary filter unit 1 and the electromagnet 2. This was done for the purpose of clarity.

Although various minor modifications may be suggested by those versed in the art, it should be understood that we wish to embody within the scope of the patent warranted hereon, all such modifications as reasonably and properly come within the scope of our contribution to the art.

We claim:

1. In a liquid jet recorder having a capillary tube, a permanent magnet, an electromagnet, said electromagnet comprising a core and a winding, said capillary tube having one end connected to a filter which is connected to a liquid pump, the other end of the capillary tube being bent to form a nozzle to direct a recording jet onto a recording carrier, said permanent magnet being carried on the capillary tube and arranged in an air gap of the electromagnet, the improvement comprising the core of the electromagnet comprising an inner tube with the winding arranged thereon, said inner tube coaxially surrounding the capillary tube with the winding being coaxial with the capillary tube.

2. In a liquid jet recorder according to claim 1, wherein the electromagnet includes an outer tube consisting of a magnetizable material, said outer tube acting as a magnetic shield.

3. In a liquid jet recorder according to claim 1, wherein the capillary tube is coaxially received within a guide and dampening tube, and includes bearings extending between the guide and dampening tube and the capillary tube on each side of the permanent magnet.

4. In a liquid jet recorder according to claim 3, wherein the guide and dampening tube is filled with a dampening liquid.

5. In a liquid jet recorder according to claim 1, wherein the inner tube of the electromagnet has an extension, wherein the electromagnet includes an outer tube having an extension, said outer tube coaxially surrounding the inner tube and winding with the extensions forming the poles of the electromagnet, and said electromagnet further including a centering sleeve of nonmagnetizable material disposed between the inner tube and outer tube to determine the air gap between the two extensions.

6. In a liquid jet recorder according to claim 5, wherein a straight section of the capillary tube is surrounded by a guide and dampening tube and wherein a pair of bearings support the capillary tube within the guide and dampening tube and are arranged on each side of the permanent magnet.

7. In a liquid jet recorder according to claim 1, wherein the capillary tube is fixedly connected to the filter to form a filter capillary unit on which the electromagnet is detachably connected.

8. In a liquid jet recorder according to claim 7, wherein the filter capillary unit and said electromagnet have the same external diameters so that when they are assembled together, they provide a pin-like configuration.

9. In a liquid jet recorder according to claim 7, wherein the inner tube of the electromagnet has a longitudinal extending slot so that during assembly of the electromagnet onto the capillary tube, the nozzle of the capillary tube may be passed through the inner tube of the electromagnet.

10. In a liquid jet recorder according to claim 9, wherein said electromagnet includes an outer tube coaxially surrounding the inner tube and having an extension, said inner tube having an extension, and a centering sleeve of non-magnetizable material disposed between the inner tube and the outer tube to determine the air gap between the two extensions which form the poles of the electromagnet.

* * * * *